Oct. 20, 1953  L. V. ROBINSON  2,655,684
ROLLER CONSTRUCTION
Filed Sept. 14, 1949
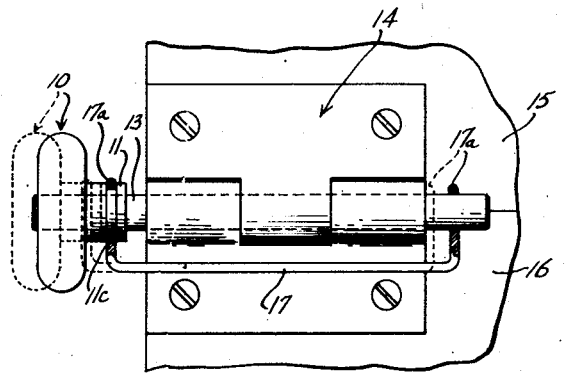
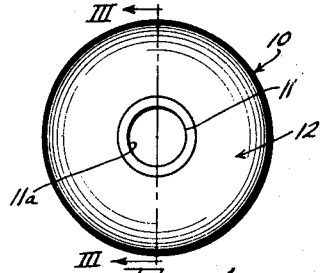
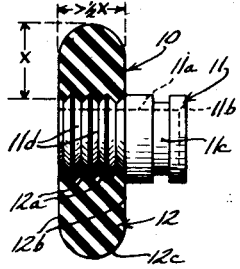
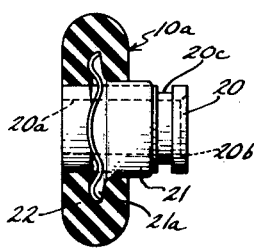
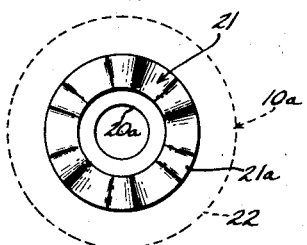
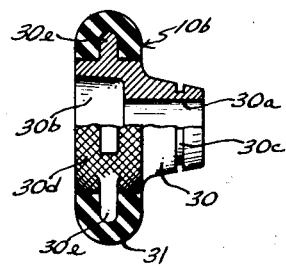
Inventor
LOWELL V. ROBINSON
by Attys.

UNITED STATES PATENT OFFICE 2,655,684

ROLLER CONSTRUCTION

Lowell V. Robinson, Detroit, Mich., assignor to Crawford Door Company, Detroit, Mich., a corporation of Michigan Application September 14, 1949, Serial No. 115,613

1 Claim. (Cl. 16—107)

This invention relates to inexpensive silent rollers especially useful in upward acting door constructions and the like.

More specifically, this invention relates to a noiseless roller construction composed of a metal hub portion and a rubber or plastic material body and rim portion. While the invention will be specifically hereinafter described as embodied in rollers for upward acting garage doors, it should be understood that the constructions of this invention are not limited to such usuage, but are generally useful wherever rollers are desired.

According to this invention, inexpensive noiseless rollers are produced from metal bar stock, preferably brass, and from a moldable material such as rubber. The bar stock is inexpensively and rapidly formed on a screw machine into the roller hub. The moldable material is inexpensively and easily molded around a portion of the hub into the shape of the roller body and is integrally bonded to the hub. The molded material provides its own tire and no external casing or additional parts are required.

A feature of the invention resides in the provision of contours on the metal hub which will retain the molded material in position and form a good bonding surface for the material. In one embodiment of the invention, the contour is produced by individual V-shaped grooves which are rough cut by the screw machine at spaced intervals around a portion of the hub. These grooves form excellent locking valleys and protuberances for anchoring the moldable material. In another form, the hub is equipped with a shroud which can be a stamped cup press-fitted onto the hub to provide an outwardly flaring flange for projecting into the body of the molded material. In a third embodiment of the invention, the hub can be equipped with a plurality of radially projecting lugs which are embedded in the molded material.

Another feature of the invention resides in the elimination of noisy bearing elements such as balls, rollers, and the like and the utilization of the internal wall of the hub as a bearing surface. Since the hub is preferably composed of brass, a brass bearing wall is provided for free rotation on a roller-supporting axle such as a steel pintle.

It is, then, an object of this invention to provide an inexpensive noiseless roller construction having a body composed of sound-deadening material and a hub containing its own bearing wall.

A still further object of the invention is to provide a door roller construction wherein a metal hub rotates directly on a supporting axle and is integrally bonded to a radially projecting body of sound-deadening material which forms its own wear-resisting tire.

A still further object of the invention is to provide a noiseless roller composed of a metal hub having a predesigned peripheral contour to anchor molding material such as rubber and including a main body formed of moldable material in integrally bonded relation to the contoured portion of the hub.

Other and further objects of this invention will become apparent to those skilled in the art from the following detailed description of the annexed sheet of drawings which, by way of preferred examples only, illustrate several embodiments of the invention.

On the drawings:

Figure 1 is an end view of a roller and hinge construction utilizing the hinge pintle as an axle for a roller of this invention, and illustrating the manner in which a groove in the roller hub receives the eye end of a wire retainer for holding the roller on the pintle while accommodating limited axial shifting of the roller.

Figure 2 is a plan view of a preferred form of roller construction according to this invention.

Figure 3 is a vertical cross-sectional view, with a part in elevation, taken along the line III—III of Figure 2.

Figure 4 is a view similar to Figure 3 but illustrating a modified roller construction according to this invention.

Figure 5 is an end elevational view of the hub portion of the modified roller construction shown in Figure 4 and illustrated in dotted lines the surrounding body portion for the roller.

Figure 6 is a view similar to Figure 3 but illustrating another modified embodiment of the invention.

Figure 7 is a view similar to Figure 5 but illustrating the hub of the roller construction of Figure 6.

As shown on the drawings:

The roller construction 10 of Figures 1 to 3 includes a brass hub 11 and a molded rubber body 12 integrally bonded to a contoured portion of the hub. The hub terminates flush with one face of the body 12 but projects beyond the other face of the body for a considerable distance. As shown in Figure 3, the hub has about one-half of its length embedded in the body 12 while the other half of its length projects from one face of the body. As also shown, the body 12 has a width which is greater than one-half of the radial distance between the inner and outer diameters of the body. Thus, as illustrated, the body 12 has a dimension "X" between its inner and outer peripheries and a dimension $>\frac{1}{2}X$ for its width. This relationship is desirable to provide sufficient strength in the body for resisting bending moments and the like which might occur during use of the roller construction.

The hub 11 is preferably formed on a screw machine from a solid brass bar or rod and has a straight cylindrical bore 11a therethrough affording a bearing wall of appreciable length. A beveled counterbore 11b is formed in the mouth of the bore 11a at the projecting end of the hub. A peripheral groove 11c is formed around the projecting portion of the hub in spaced relation from the adjacent end face of the body 12. The portion of the hub embeded in the body is contoured to provide a good anchoring surface and, as illustrated in Figure 3, has a series of concentric V-shaped grooves 11d therearound. These grooves are rough-cut on the screw machine and are isolated from each other so that the body member cannot be unscrewed off of the hub in the event that its bond is broken.

The body 12 is molded directly on the grooved portion 11d of the hub 11 and thus has concentric protuberances 12a anchored in the grooves 11d. The body has flat side faces 12b and a rounded or torus shaped periphery 12c providing the tire for the roller.

The body is preferably composed of hard rubber which is molded directly on the hub to be integrally vulcanized to the grooved portion 11d thereof. A very hard rubber is desired, preferably having a durometer hardness of about 85.

As shown in Figure 1, in the preferred use of the roller construction 10 the hub 11 is directly mounted on a steel pintle 13 of a hinge 14 which joins two adjacent door sections 15 and 16. As shown, the pintle connects the hinge leaves and projects beyond both ends of the leaves. One end of the pintle projects beyond the end edges of the door section to receive the roller. A retainer 17 in the form of a wire with eye ends 17a disposed over the ends of the pintle, has one eye loosely seated in the groove 11c of the hub. As shown in dotted lines in Figure 1, the roller will thus have limited axial movement on the pintle 13 but the retainer 17 will prevent axial displacement of the roller hub off of the free end of the pintle, since one eye end 17a of the retainer will abut the hinge leaves before the hub rides off of the end of the pintle.

The brass bearing wall afforded by the elongated cylindrical bore 11a of the hub 11 forms an excellent bearing of enhanced area for riding freely on the steel pintle 13. Additional bearing means are unnecessary and the roller construction of this invention will carry very heavy loads without binding.

In the embodiment shown in Figures 4 and 5 the modified roller 10a is composed of a brass hub 20, a pressed-on stamped metal tubular member 21, and a rubber body 22. The hub 20, like the hub 11, has a cylindrical bore 20a therethrough affording an elongated plane bearing wall and this bore is chamfered or beveled at the projecting end of the hub as at 20b to facilitate bonding of the hub on the pintle. The retainer groove 20c is also provided on the projecting end of the hub. However, instead of providing the hub 20 directly with a good bonding contour, a stamped metal tubular member 21 is press-fitted onto the hub to extend from adjacent the groove 20c into spaced relation from the remote end of the hub.

This tubular member 21 has an outturned fluted flange portion 21a on the end thereof and this flange portion projects radially into the body 22. The body 22 is thus molded partly on the tubular member 21 and partly on the portion of the hub which projects beyond the tubular member. The flange 21a is embedded in the body to form a good anchoring bond and to also assist in radially rigidifying the body. The roller construction 10a is used in the same manner as illustrated in connection with the roller 10 of Figure 1.

In the embodiment shown in Figures 6 and 7 the roller construction 10b has a hub 30 and a molded-on rubber body 31. The hub 30 is formed on a screw machine and is composed of brass, to provide a bore 30a affording a bearing wall. An enlarged counterbore 30b is provided in the portion of the hub which receives the body 31. This counterbore does not afford a bearing wall, being spaced radially outward from the bearing wall 30a. The retainer groove 30c is provided in the projecting portion of the hub as illustrated.

The portion of the hub in the body 31 is knurled as at 30d and has four radially projecting lugs 30e in equally spaced relation therearound. These lugs extend into the body 31 and assist the knurled portion 30d in holding the body integrally on the hub.

The roller construction 10b is adapted for use in the same manner as the construction 10 as shown in Figure 1.

From the above descriptions it will be understood that this invention provides inexpensive roller constructions especially adapted for upward-acting garage doors. The constructions are composed of metal hubs and sound-deadening bodies. The metal hubs are inexpensively produced on screw machines and provide their own bearings. The sound-deadening bodies are molded directly on the hubs in integrally bonded relation therewith and the hub contours are arranged to assist in retaining the bond between the body and hub.

It will be understood that modifications and variations may be effected without departing from the scope of the novel concepts of this invention.

I claim:

A roller construction comprising a metal tube having an external groove around one end thereof, a metal tubular member pressed on said tube and having a fluted radially projecting flange aligned with an intermediate portion of the tube, and a rubber body molded on the tubular member and adjacent tube portion and receiving the fluted flange of the tubular member therein, said rubber body being shaped to provide a roller body with an integral rounded tire portion around the periphery thereof.

LOWELL V. ROBINSON.

References Cited in the file of this patent

UNITED STATES PATENTS

| Number | Name | Date |
| --- | --- | --- |
| 641,602 | McGunnigle | Jan. 16, 1900 |
| 716,342 | Livingstone | Dec. 16, 1902 |
| 932,038 | Maier | Aug. 24, 1909 |
| 998,511 | Heron | July 18, 1911 |
| 1,683,899 | Fletcher | Sept. 4, 1928 |
| 2,073,347 | Leathers | Mar. 9, 1937 |
| 2,175,646 | Replogle | Oct. 10, 1939 |
| 2,284,427 | Hufferd et al. | May 26, 1942 |

FOREIGN PATENTS

| Number | Country | Date |
| --- | --- | --- |
| 515,603 | Great Britain | Dec. 8, 1939 |